United States Patent
Quirant et al.

(10) Patent No.: US 9,561,787 B2
(45) Date of Patent: Feb. 7, 2017

(54) BRAKING SYSTEM INCLUDING FIRST AND SECOND BRAKE PRESSURE GENERATOR AS WELL AS A METHOD FOR OPERATING SUCH A BRAKING SYSTEM

(71) Applicant: Robert Bosch GmbH, Stuttgart (DE)

(72) Inventors: Werner Quirant, Beilstein (DE); Karl-Heinz Willmann, Freiberg (DE); Urs Bauer, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/579,503

(22) Filed: Dec. 22, 2014

(65) Prior Publication Data

US 2015/0175146 A1 Jun. 25, 2015

(30) Foreign Application Priority Data

Dec. 23, 2013 (DE) .................. 10 2013 227 065

(51) Int. Cl.
*B60T 13/66* (2006.01)
*B60T 7/04* (2006.01)
*B60T 13/14* (2006.01)
*B60T 13/68* (2006.01)

(52) U.S. Cl.
CPC ............. *B60T 13/662* (2013.01); *B60T 7/042* (2013.01); *B60T 13/146* (2013.01); *B60T 13/686* (2013.01)

(58) Field of Classification Search
CPC ............ B60T 7/70; B60T 13/58; B60T 13/66; B60T 13/662; B60T 8/17; B60T 8/34; B60T 8/42; B60T 8/60; B60T 8/442; B60T 8/4081

USPC ................ 303/10, 115.2–115.5, 116.1–116.4
See application file for complete search history.

(56) References Cited

U.S. PATENT DOCUMENTS

| | | | |
|---|---|---|---|
| 2005/0088040 A1* | 4/2005 | Otsuka | B60T 8/368 303/116.4 |
| 2008/0116740 A1* | 5/2008 | Yokoyama | B60T 7/042 303/20 |
| 2008/0290726 A1 | 11/2008 | Inoue et al. | |
| 2010/0001577 A1* | 1/2010 | Hatano | B60T 8/4081 303/3 |
| 2011/0285199 A1* | 11/2011 | Ishida | B60T 7/042 303/3 |
| 2012/0013174 A1* | 1/2012 | Ishida | B60T 8/441 303/10 |

(Continued)

FOREIGN PATENT DOCUMENTS

| DE | 10233196 | 2/2003 |
|---|---|---|
| DE | 102012205861 | 10/2012 |

*Primary Examiner* — Christopher Schwartz
(74) *Attorney, Agent, or Firm* — Norton Rose Fulbright US LLP; Gerard Messina

(57) ABSTRACT

A hydraulic braking system is provided as well as a method, relating to a master brake cylinder, a first brake pressure generator, as well as a wheel brake cylinder. The braking system includes a second brake pressure generator which is connected to the at least one wheel brake cylinder. The master brake cylinder is hydraulically connectable to the at least one wheel brake cylinder via the second brake pressure generator. This has the advantage that a secure braking system may be provided including one additional fallback level, hydraulically via the driver as well as by providing a second, additional brake pressure generator.

19 Claims, 6 Drawing Sheets

(56) References Cited

U.S. PATENT DOCUMENTS

| | | | |
|---|---|---|---|
| 2012/0299367 A1* | 11/2012 | Ross | B60T 8/4872 |
| | | | 303/3 |
| 2012/0313427 A1* | 12/2012 | Nishioka | B60T 7/042 |
| | | | 303/10 |
| 2014/0110997 A1* | 4/2014 | Biller | B60T 8/4081 |
| | | | 303/9.62 |
| 2014/0203626 A1* | 7/2014 | Biller | B60T 8/4081 |
| | | | 303/10 |
| 2016/0023644 A1* | 1/2016 | Feigel | B60T 8/4081 |
| | | | 303/3 |

* cited by examiner

BRAKING SYSTEM INCLUDING FIRST AND SECOND BRAKE PRESSURE GENERATOR AS WELL AS A METHOD FOR OPERATING SUCH A BRAKING SYSTEM

BACKGROUND INFORMATION

German Unexamined Patent Application No. DE 102 33 196 describes a braking system which includes a hydraulically actuatable brake cylinder for actuating a brake. The system furthermore includes a pressure control cylinder which may be used to set a pressure in the wheel brakes. The pressure control cylinder may be acted on with the aid of an electronic displacement device. If the pressure control cylinder fails, no assisting force may be provided by an assisting system. Such a failure may, for example, be a failure of the motor, which makes it no longer possible to increase pressure using an assistance force but only by the driver using only physical strength.

SUMMARY

It is an object of the present invention to ensure a redundant design of a hydraulic braking system which in the case of failure of a motor, which provides an assisting force, is still able to brake with electrical assistance.

The hydraulic braking system according to the present invention includes one master brake cylinder, one first brake pressure generator, as well as one wheel brake cylinder. The braking system includes a second brake pressure generator which is connected to the at least one wheel brake cylinder. According to the present invention, the master brake cylinder is hydraulically connectable to the at least one wheel brake cylinder via the second brake pressure generator. This has the advantage that a secure braking system may be provided including one additional fallback level, hydraulically via the driver as well as by providing a second, additional brake pressure generator.

In one advantageous embodiment of the hydraulic braking system, the first and the second brake pressure generator as well as the master brake cylinder are connectable to the at least one wheel brake cylinder using an interruption means. Such a first interruption means may, for example, be a valve. Thus all components of the braking system which are capable of generating brake pressure at the wheel brake cylinders are advantageously connectable to the wheel brake cylinders using a valve.

In one additional embodiment of the hydraulic braking system, the second brake pressure generator includes at least a second interruption means—i.e., an additional valve—which makes it possible to hydraulically connect the master brake cylinder to the at least one wheel brake cylinder. This has the advantage that the effect of the second brake pressure generator is adjustable via switching of the additional valve.

In addition, the second brake pressure generator of the hydraulic braking system may include at least one pump which is connected in parallel to the second interruption means and with the aid of which pressure may be applied to the at least one wheel brake cylinder. In this way, pressure may be built up at the wheel brake cylinder using the second brake pressure generator even independently of the driver, which increases the safety in the case of failure of the first brake pressure generator.

In one advantageous embodiment, the second brake pressure generator includes at least one check valve which is connected in parallel to the pump and the second interruption means. In this way, there is always a hydraulic connection between the master brake cylinder, which is actuatable by the driver, and the wheel brake cylinder as a hydraulic fallback level. This is important, for example, in case electrical energy is no longer available to operate the two brake pressure generators.

In an advantageous refinement, the hydraulic line, which connects the first and the second interruption means, has a third interruption means between the first and the second interruption means. In this way, the second brake pressure generator may be coupled to or uncoupled from the wheel brake cylinder as needed. Such a connection via valves provides a decoupling of the effect of the first brake pressure generator during normal operation and in the fallback level of the second brake pressure generator since each brake pressure generator unit controls the respective valves assigned to it itself. In addition, protection of the pump from high pressure values is guaranteed when the pump is not active. Furthermore, by having the interruption means it is ensured that, via the pump, pressure generated by the plunger does not—in addition to the valve and the check valve—lead to volume outflow via the pump.

The first brake pressure generator is connected hydraulically between the first and the third interruption means in an advantageous way, in particular via a fourth interruption means. With this connection possibility, either the first or the second brake pressure generator is able to guarantee the pressure buildup via the involved interruption means.

A simulator unit is connected in parallel to the connection between the master brake cylinder and the second brake pressure generator in an advantageous way, this simulator unit including in particular a fifth interruption means as well as a check valve. With the aid of the simulator unit it is possible during normal operation to convey to the driver the pedal feeling expected by the driver. Pedal feeling may, for example, be understood to mean the force that needs to be applied in order to bring a brake pedal or a brake handle into a certain actuating position and/or to maintain it there.

The second brake pressure generator advantageously has a motor assigned to the second brake pressure generator as well as a control unit assigned to the second brake pressure generator, the control unit and/or the motor of the second brake pressure generator having their own power supply. In this way it is ensured that even in the case of failure of a first power supply, which is assigned to the first brake pressure generator, there is enough external energy remaining in order to ensure a brake force assistance using the second brake pressure generator and the additional energy source in the form of the second power supply. If the two power supplies are assigned to different electrical, independent energy sources, a sufficiently safe operation of the braking system may be ensured even for highly automated driving functions, until the driver is able to take over the responsibility for driving of the vehicle again.

In another embodiment, the second brake pressure generator includes a sensor system, with the aid of which a driver's braking intent is derivable, in particular a pressure sensor system. In this way, the driver's braking intent, which means the intensity with which the driver intends to brake, may also be ascertained with the aid of the second brake pressure generator. Here it is advantageous that the driver's braking intent may be ascertained with the aid of the independent power supply of the second brake pressure generator even in case of an error in the first brake pressure generator unit.

In an advantageous refinement, the second brake pressure generator is provided as a separate component.

The second brake pressure generator may be connected to the component which includes the first brake pressure generator, via hydraulic lines.

The second brake pressure generator may also be fastened to a component which includes the first brake pressure generator, in particular flange-mounted or screwed on.

The second brake pressure generator may also be integrated into a shared component together with the first brake pressure generator.

In this way, a flexible design of the construction of the second brake pressure generator is made possible; the construction may be adjusted to the present requirements relating to compact design, material requirements and available installation space.

The brake pressure is adjustable in an advantageous way at the at least one wheel brake cylinder with the aid of the second brake pressure generator in case of failure of the first brake pressure generator.

It is also advantageous that the brake pressure is adjustable at the at least one wheel brake cylinder with the aid of the master brake cylinder in case of failure of both the first brake pressure generator as well as the second brake pressure generator.

In the method according to the present invention the hydraulic braking system is made use of using the following steps:
  providing a signal by the first brake pressure generator with regard to a malfunction of the first brake pressure generator;
  receiving the signal by the second brake pressure generator regarding the malfunction of the first brake pressure generator;
  hydraulically decoupling the first brake pressure generator from the at least one wheel brake cylinder by the fourth interruption means;
  hydraulically connecting the second brake pressure generator to the at least one wheel brake cylinder;
  setting a brake pressure in the at least one wheel brake cylinder with the aid of the second brake pressure generator.

The decoupling is ensured in an advantageous way with the aid of the fourth interruption means via a deenergized closed rest position of the used valves. Setting the brake pressure is carried out according to the specification from the driver or according to a highly automated driving function.

DETAILED DESCRIPTION

Figure 1:
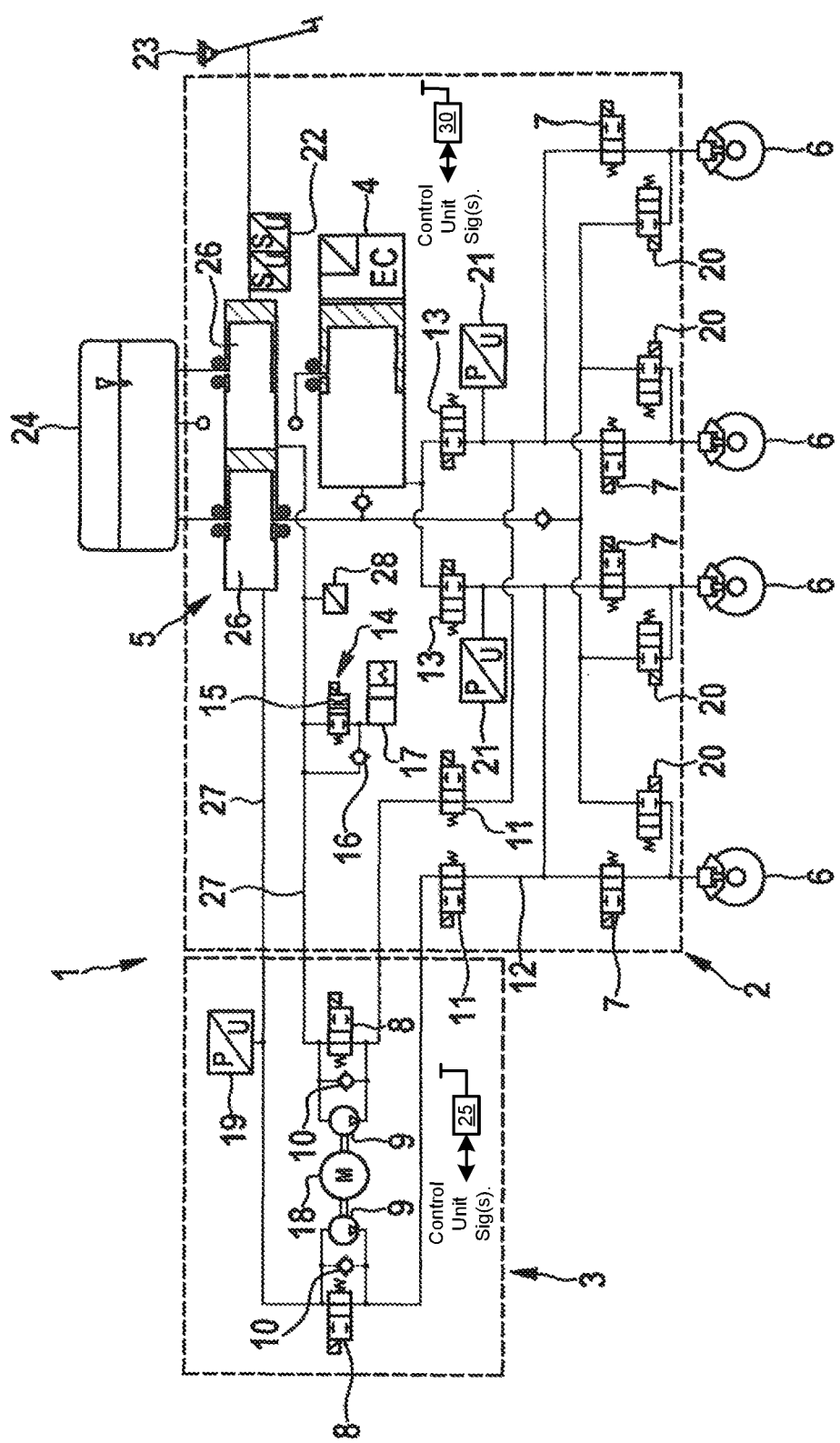
FIG. 1 shows a first embodiment of the braking system according to the present invention.

FIG. 1 shows a hydraulic braking system 1 which is able to build up hydraulic brake pressure at wheel brake cylinders 6. Hydraulic braking system 1 includes a pressure buildup unit 2 as well as a fail-boost unit 3. With the aid of pressure buildup unit 2, brake pressure may be built up at wheel brakes 6 during normal operation of the hydraulic braking system. With the aid of fail-boost unit 3, brake pressure may also be generated at wheel brakes 6 in case of failure of pressure buildup unit 2. A failure of the pressure buildup unit is to be understood as errors in the electronic system of the pressure buildup unit as well as in the actuators of the pressure buildup unit. Other errors may also be taken into account.

Pressure buildup unit 2 includes a master brake cylinder 5 as well as a first brake pressure generator 4. The pressure buildup unit also includes a pedal simulator unit 14 and is mechanically actuatable with the aid of an actuation unit 23. An actuation unit may, for example, be a brake pedal or a brake handle, which may be actuated by the vehicle driver. Actuation unit 23 is mechanically connectable to master brake cylinder 5 and may thus effect a pressure buildup in a known manner in chambers 26 of master brake cylinder 5.

Chambers 26 of master brake cylinder 5 include hydraulic lines 27 which lead to fail-boost unit 3. In addition, chambers 26 of master cylinder 5 are hydraulically connected to a hydraulic fluid reservoir 24. At least one of the hydraulic lines 27 is hydraulically connected to a pedal simulator unit 14. Pedal simulator unit 14 is hydraulically connected between the terminal for fail-boost unit 3 and chamber 26 of the master brake cylinder. Hydraulic lines 27 may also include a pressure sensor 28 to display the pressure prevailing in the hydraulic line.

Pressure generating unit 2 also includes a first pressure generator 4, which includes at least one chamber which is connected hydraulically to hydraulic reservoir 24. Pressure generator 4 is independently, i.e., independent of the driver, able to generate a brake pressure at wheel brakes 6 by electrically actuating pressure generator 4. A first embodiment of such a brake pressure generator 4 may, for example, be a motor-operated adjustable piston-cylinder-unit, also known as a plunger. By displacing the piston of the piston-cylinder unit of brake pressure generator 4, hydraulic fluid is displaced toward the wheel brakes, which results in an increase in pressure in wheel brakes 6. Currentless open valves 13, with the aid of which the hydraulic connection between brake pressure generator 4 and wheel brakes 6 may be cut off, are situated between first brake pressure generator 4 and wheel brakes 6 of the braking system. Additional, currentless open valves 7, so-called intake valves 7 of wheel brakes 6, are situated between hydraulic valves 13 and wheel brakes 6. Additional brake pressure sensors 21 may be present in the form of pressure sensors between interruption valves 13 and intake valves of wheel brakes 7.

Hydraulic connecting points, which may be used to connect fail-boost unit 3 to wheel brakes 6, are also situated between valves 13 and intake valves 7. The connection between fail-boost unit 3 and these wheel brakes furthermore takes place via shutoff valves 11. Shutoff valves 11 are currentless open valves.

Each wheel brake furthermore includes an outlet valve 20 which is hydraulically connected to hydraulic fluid reservoir 24 for returning the hydraulic fluid. Outlet valves 20 are closed directly by the driver using master brake cylinder 5 or by fail-boost unit 3 during pressure buildup by first brake pressure generator 4, and plunger 4. Outlet valves 20 are closed in the deenergized state.

Pedal simulator unit 14 includes, for example, a cylinder having a spring-loaded piston as well as a chamber, for example, a cylinder chamber, which may admit hydraulic fluids, which is displaced toward pedal simulator unit 14 by the driver via master brake cylinder 5. The feed line to piston cylinder system 17 of pedal simulator unit 14 is formed by a throttle valve 15 as well as a check valve 16 which is connected in parallel. In this way, the pedal simulator may be switched on and off. Check valve 16 is advantageous when the brake pedal is released quickly. The brake fluid may escape from the pedal simulator through check valve 16 when the driver releases the brake actuation. Because the brake fluid escapes quickly from the pedal simulation, there is no "post-braking effect" of the vehicle, which is undesirable and noticeable for the driver.

Hereafter, fail-boost unit 3 is described. Fail-boost unit 3 includes two feed lines as well as two drain lines. One feed line is respectively connected to one drain line each. The feed lines are connected with lines 27, which are hydraulically connected to chambers 26 of master brake cylinder 5. The setup of the hydraulic components of the respective inlet and drain lines is identical. A hydraulic pump 9, a check valve 10, and a currentless open shutoff valve 8 are situated in each hydraulic connection between feed line and drain line. Furthermore, fail-boost unit 3 includes a pump motor 18 to operate pumps 9. Identical components are labeled using identical reference numerals. Check valve 10 enables through-flow of hydraulic fluid coming from master brake cylinder 5 via line 27 toward wheel brake cylinder 6, the opposite direction not being possible due to check valve 10. The outlet of fail-boost unit 3 is connectable to valves 11 mentioned previously of the pressure generating unit and thus connectable via valves 11 and inlet valves 7 to wheel brakes 6.

Further features of fail-boost unit 3 are that it includes its own motor 18 including the associated electronics. Furthermore, fail-boost unit 3 includes its own control unit 25 assigned to fail-boost unit 3 including an independent power supply. Fail-boost unit 3 includes furthermore a pressure sensor 19, with the aid of which the driver's braking intent, which corresponds to the pressure of the master brake cylinder, is obtainable.

The fail-boost unit furthermore includes a communication interface for connecting fail-boost unit 3 to pressure generator unit 2, via which errors in pressure generating unit 2 may be transmitted to fail-boost unit 3. For example, status information of pressure generating unit 2 may be transmitted via this communication interface. Furthermore, information about the activation state of fail-boost unit 3 may be transmitted. The control units 30, 25 of pressure generating unit 2, there in particular the control unit of brake pressure generator 4, and fail-boost unit 3 are able to check each other's communication. The control units 25, 30 of fail-boost unit 3 and pressure generating unit 2 are designed to respectively set the output of brake pressure generator 4 or pump 10.

Fail-boost unit 3 furthermore includes a communication interface with the instrument panel of the vehicle in order to provide the driver with information regarding the state of operation of pressure generating unit 2, if necessary. This may take place via visual, auditory or also tactile feedback. It is also possible that fail-boost unit 3 includes a communication interface to the engine control unit of the vehicle in order to limit the vehicle speed to a maximum value by reducing the output, if necessary. This increases the safety of the system.

Fail-boost unit 3 may be directly flange-mounted to the pressure generating unit 2. It is also conceivable that fail-boost unit 3 is situated at a distance from pressure generating unit 2 and is connected to it via hydraulic lines. Furthermore it is possible to integrate pressure generating unit 2 and fail-boost unit 3 into one and the same hydraulic block.

The functionality of fail-boost unit 3 is described below together with pressure generating unit 2. If the brake force booster on the part of first brake pressure generator 4, i.e., the plunger in the example of FIG. 1, fails in part or completely, pressure may be built up via fail-boost unit 3. In an error-free case of the shown braking system, valves 8 are closed so that a connection from master brake cylinder 5 to wheel brakes 6 is cut off. A connection of the master brake cylinder to wheel brakes 6 is only possible via check valves 10. When the driver actuates master brake cylinder 5 via actuating element 23 in order to carry out a brake maneuver, the master brake cylinder displaces hydraulic fluid from one chamber 26 into pedal simulator unit 14, whereby simulator valve 15 is opened. The pedal simulator unit conveys to the driver the expected pedal feeling. The driver's braking intent may be detected via sensor system 22, for example, a pedal travel sensor. A corresponding pressure, which corresponds to the instantaneous driver's braking intent, may also be ascertained, with the aid of pressure sensors 19 and 28, which are hydraulically connected to master brake cylinder 5.

Corresponding to the input of the driver's braking intent, first brake pressure generator 4 generates a brake pressure with the aid of its motor and the control unit, the brake pressure being conveyed via valves 13 and inlet valves 7 to wheel brakes 6. In this way, a brake pressure corresponding to the driver's braking intent may be generated at wheel brake cylinders 6 with the aid of brake pressure generator 4.

In a second operating mode, the brake pressure may be set at wheel brake cylinders 6 with the aid of fail-boost unit 3. Such a second operating situation exists, for example, when first brake pressure generator 4 is defective. Such a defect may, as explained above, be an electronic defect, for example, in the control unit or in the servomotor of brake pressure generator 4.

In such a defective state, valve 7 is currentless and open. Valve 8 is energized and thus closed, and valve 11 is currentless and thus open. In this way, it is possible to build up pressure using pump 9 of fail-boost unit 3. Check valve 10 of fail-boost unit 3 ensures that, by actuating the pedal, the driver is always able to still increase the pressure in the braking system generated by pump 9. Thus the requirement is met that the driver must be able to directly act on the wheel brakes in a mechanical or hydraulic and mechanical manner and thus to brake the vehicle. Even if only fail-boost unit 3 is supplied with power and there are problems in supplying the second brake pressure generator, fail-boost unit 3, with power, the driver is still able to act via fail-boost unit 3.

Brake pressure may be built up in wheel brake cylinders 6 by establishing the hydraulic connection from pump 9 to wheel brake cylinders 6 via shutoff valve 11 and inlet valves 7 with the aid of pump 9, which is part of fail-boost unit 3. Thus an independent possibility of generating pressure independent of the operating state of first brake pressure generator 4 is feasible. Fail-boost unit 3 thus represents a redundant possibility of generating pressure in the wheel brake cylinders.

The design of the braking system shown in FIG. 1 clearly shows that a braking system is illustrated which has two brake circuits. For this reason, fail-boost unit 3 also has a symmetrical structure including two pumps 9, two check valves 10 and two shutoff valves 11. This permits separating the pressure conditions of each circuit.

The device according to the present invention of the hydraulic braking system may be operated with the aid of a method according to the present invention. To this effect, a signal is provided in a first step 301 by brake pressure generator 4 regarding an error function of the same. This signal is subsequently received by fail-boost unit 3 in step 302. Then, in step 303 the first brake pressure generator is hydraulically decoupled from intake valve 7—and thus from wheel brakes 6—by closing valves 13 with the aid of control valves 13. In step 304, fail-boost unit 3 is connected to wheel brake cylinders 6.

Furthermore, in step 305, a hydraulic brake pressure is fed into wheel brakes 6 by operating pumps 9 of fail-boost unit 3 via opened valves 11 and 7. During this process, shutoff valves 8 remain closed. Thus the driver's braking intent may be boosted with the aid of pump 9, or a pressure request of a highly automated driving function is implementable.

A possible further or additional error case corresponds to a communication failure between fail-boost unit 3 and brake pressure generator 4. A communication failure may be the failure of data connections between the corresponding control units of brake pressure generator 4 and fail-boost unit 3. Here, brake pressure generator 4 and fail-boost unit 3 no longer know the operating mode of the other.

Figure 4:
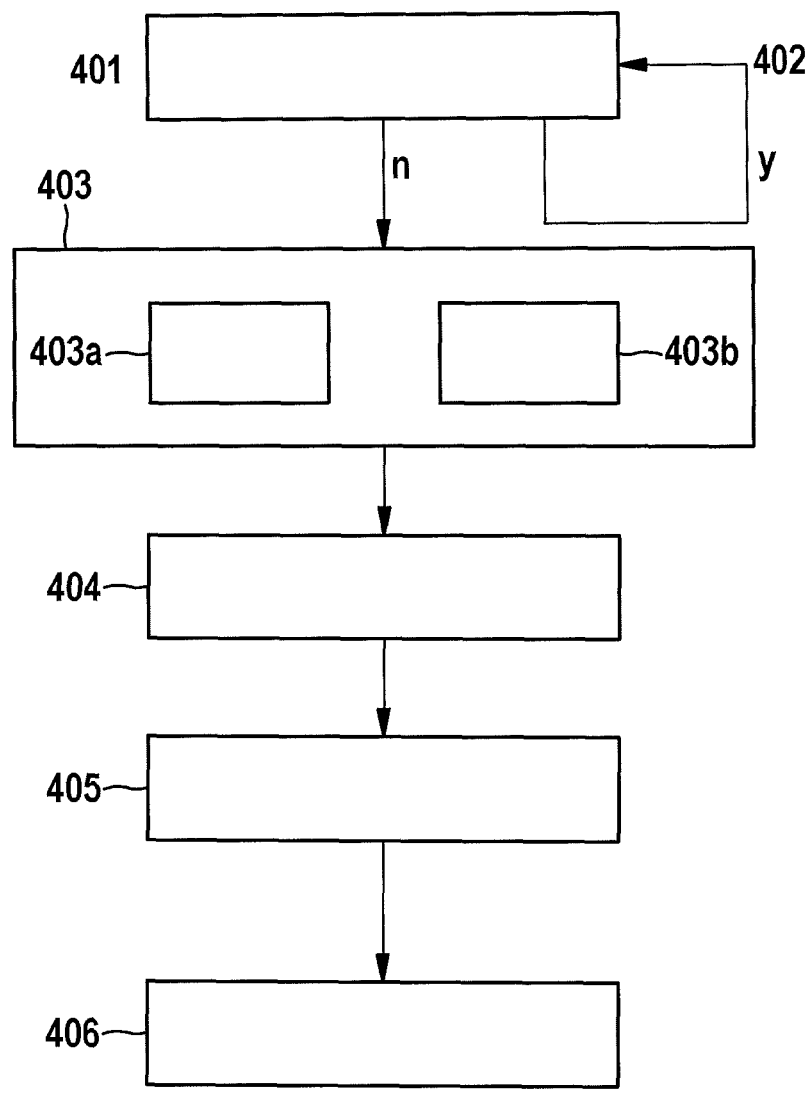
FIG. 4 shows a method according to the present invention in case of failure of the communication of the two brake pressure generators.

The method described below regulates the procedure intended for this case. The method, which is explained based on FIG. 4, includes the following steps:

401: establishing whether the communication between fail-boost unit 3 and brake pressure generator 4 is intact. A decision Yes (y)/No (n) follows.

402: if in step 401 the decision is Yes (y), the method returns to step 401 and is restarted. The method may also be restarted in fixed intervals or run as continuous monitoring.

403-403a: if in step 401 the decision is No (n), the method continues in step 403. In step 403a, first brake pressure generator 4 is put into a stand-alone operation. This means that first brake pressure generator 4 is activated using a brake pressure boost which is below the maximum output of the first brake pressure generator. This represents a fallback level of first brake pressure generator 4. The range in which the brake pressure boost of the first brake pressure generator is set is within a predefined output interval. One possible output interval is between 50% and 67% of the original output.

403-403b: also in case of decision 401 No (n), the method is continued in step 403b by putting fail-boost unit 3 into a stand-alone operation. This is to be understood that the fail-boost unit is activated with an output which is below the maximum output of fail-boost unit 3. This represents a corresponding fallback level of fail-boost unit 3. Here, too, the range in which the output of fail-boost unit 3 is set is within a predefined output interval. One possible output interval is between 50% and 67% of the original output.

Figure 2:
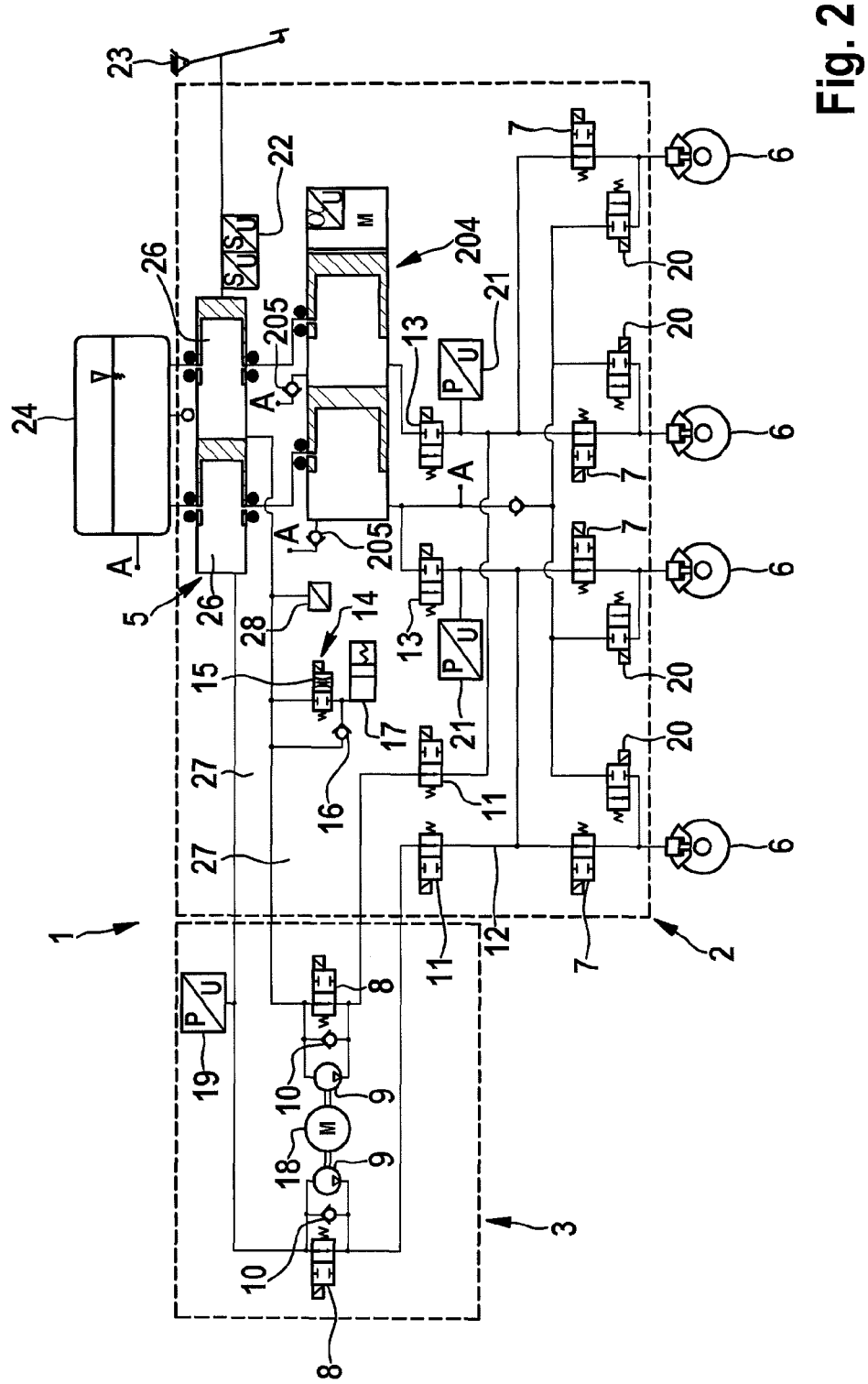
FIG. 2 shows a second embodiment of a braking system according to the present invention.
Figure 3:
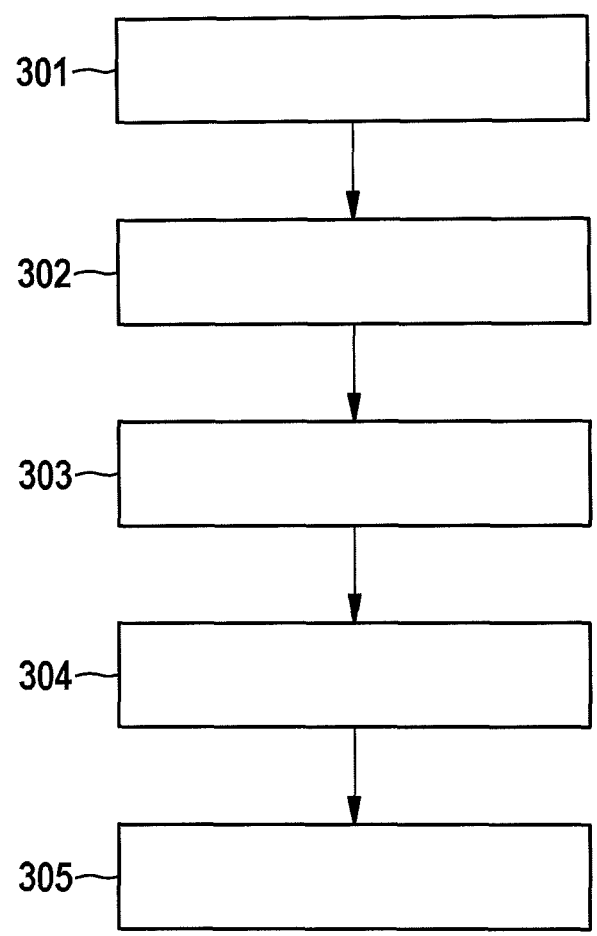
FIG. 3 shows the method according to the present invention.

FIG. 2 shows an alternative specific embodiment of brake pressure generator 4. Instead of the embodiment of first brake pressure generator 4 including one piston and one cylinder in FIG. 1, FIG. 2 shows a two-piston system. The cylinder and the two pistons of brake pressure generator 204 make it possible to provide each brake circuit of the hydraulic braking system with its own chamber.

Thus, valves 13 are respectively assigned to a chamber of first brake pressure generator 4. Valves 13 may—as shown here—be present as stand-alone valves 13, which establish the connection between inlet valves 7 and the plunger chambers on their own. It is also possible to connect check valves in parallel to valves 13 (not shown in the diagrams), which do not allow any hydraulic flow from the intake valves in the direction of the plunger, but may be passed through in the opposite direction.

In addition, the chambers of first brake pressure generator 204 are connected to hydraulic fluid reservoir 24 via check valves 205, which is indicated in the drawing with the interrupted connection A. Check valves 205 only allow a flow of hydraulic fluid in the direction from reservoir 24 to plunger 204. This embodiment of first brake pressure generator 204 is situated between the main brake cylinder and the wheel brake. Fail-boost unit 3 is again connected in parallel to first brake pressure generator 204. Other embodiments of brake pressure generating unit 4, 204 are conceivable.

Figure 5:
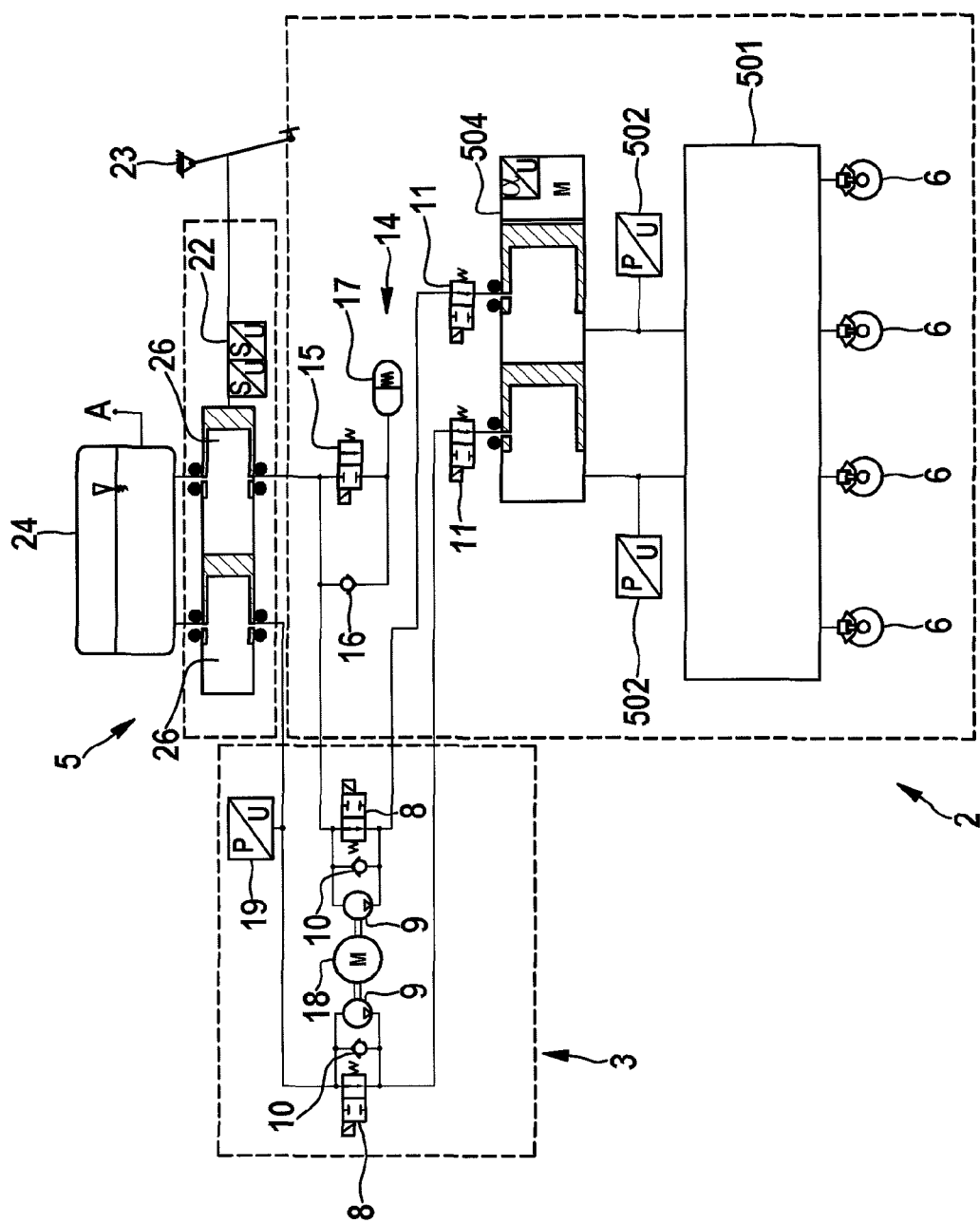
FIG. 5 shows an alternative embodiment of the braking system according to the present invention.

FIG. 5 shows one additional arrangement of the braking system according to the present invention. According to FIG. 2, a two-circuit plunger 504, which acts as a first brake pressure generator, is also used in the additional specific embodiment of FIG. 5. Unlike plunger 204 in FIG. 2, plunger 504 is now a flow-through plunger 504. The flow-through plunger 504 is situated between shutoff valves 11 and a modulation unit 501. The shutoff valves are situated in the hydraulic connection between fail-boost unit 3 and plunger 504. Based on each chamber of the plunger, hydraulic connections go to modulation unit 501 and from there to the wheel brake cylinders, which are hydraulically connected downstream, of wheel brakes 6. Pressure sensors 502 are situated in the hydraulic connections between plunger 504 and modulation unit 501.

Modulation unit 501 is a system which includes one inlet valve and one outlet valve for each wheel. Furthermore, a return pump is provided, which is able to transport the volumes from the outlet valves of the wheel brake cylinders back to the intake of modulation unit 501 in the direction of plunger 504.

Modulation unit 501 essentially corresponds to an ABS hydraulic block and includes a closed hydraulic circuit. The functionality of the braking system corresponds to the functionality of the specific embodiment described above and is not described in more detail here.

Figure 6:
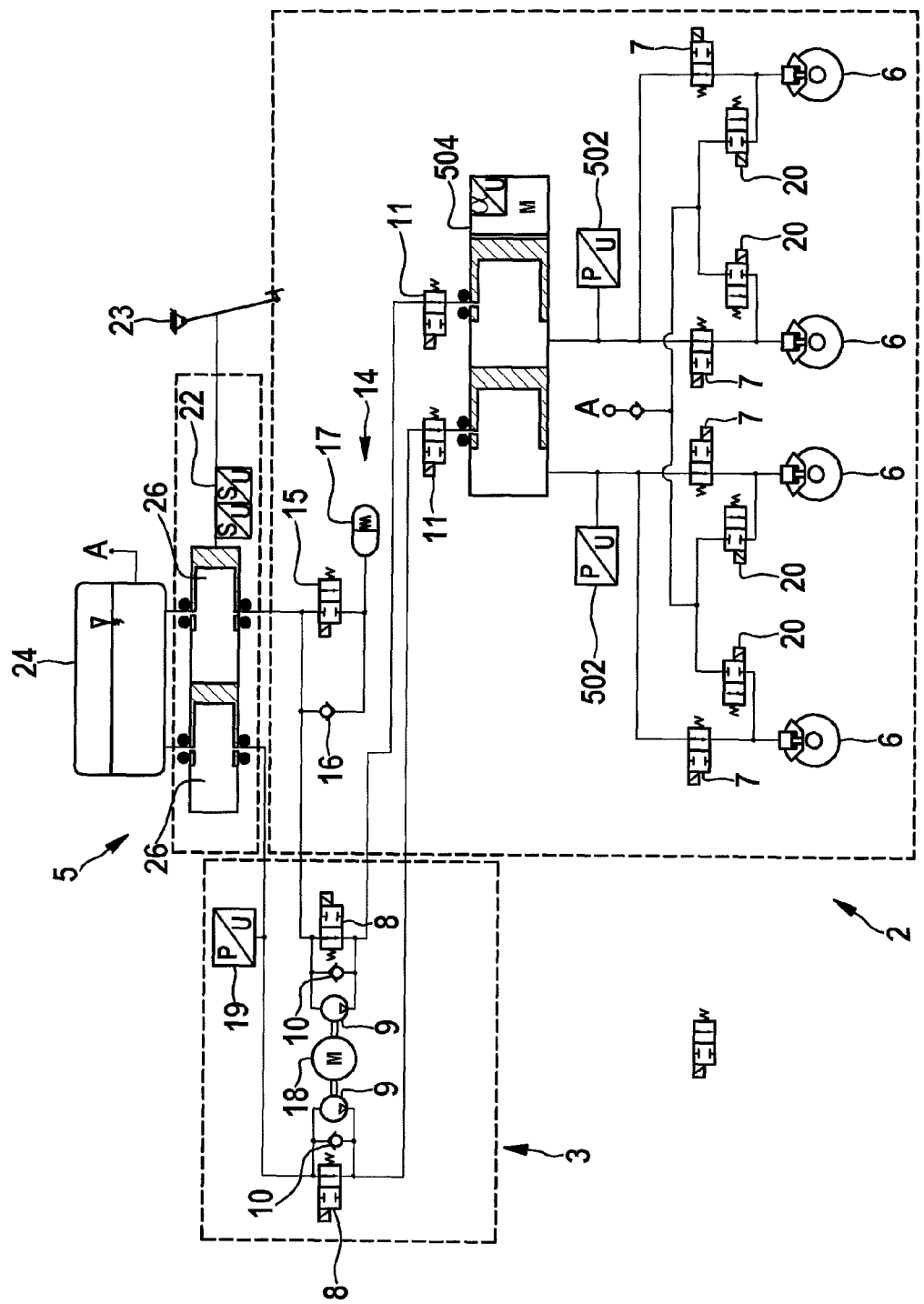
FIG. 6 shows one additional alternative arrangement of the braking system according to the present invention.

As an additional alternative specific embodiment, FIG. 6 shows a two-circuit plunger 504 in an identical arrangement behind shutoff valves 11, including pressure sensors 502.

Instead of the modulation unit having a closed hydraulic circuit, FIG. 6 shows an open system corresponding to the systems in FIGS. 1 and 2. Each wheel brake again has an inlet valve 7 and an outlet valve 20. The drain lines coming from outlet valves 20 are joined at one point which is connected to reservoir 24 via a check valve 601, which cuts off the flow of hydraulic fluid to the wheels via outlet valves 20. The volume compensation during discontinuation of braking is thus guaranteed directly via reservoir 24, and in comparison to the specific embodiment in FIG. 5, no return pump and no store are required. The connection of the open system to the reservoir is referred to with reference symbol A as a line connection in FIG. 6.

Unlike the plungers in FIGS. 1 and 2, which are not flow-through, the plunger in FIGS. 5 and 6 must have a self-locking transmission in the drive, in order to enable a mechanic fallback level in case of failure of the on-board electronic systems, the plunger drive or other malfunctions. A self-locking mechanism in a plunger is particularly advantageous in that, at the fallback level, a driver brake force generated by purely mechanical braking by the driver does not first displace the plunger before a braking effect is built up. It would also be possible to design the plunger in such a way that in a deenergized state it is put into a locked state and that the pistons of the plunger may thus no longer be moved.

As another alternative, first brake pressure generator/plungers are conceivable, which are capable of a pressure buildup in both displacement directions. The second brake pressure generator is always connected in parallel, in the specific embodiments of FIGS. 5 and 6, connected in series to the respective existing pressure generating direction.

What is claimed is:

1. A hydraulic braking system, comprising:
    a master brake cylinder;
    a first brake pressure generator;
    at least one wheel brake cylinder;
    a second brake pressure generator connected to the wheel brake cylinder, wherein the master brake cylinder is hydraulically connectable to the wheel brake cylinder via the second brake pressure generator;
    a first interruption arrangement via which the first and the second brake pressure generators and the master brake cylinder are connectable to the at least one wheel brake cylinder; and
    another interruption arrangement, in a hydraulic line connecting the second brake pressure generator to the first interruption arrangement, via which the second brake pressure generator is connectable to the at least one wheel brake cylinder.

2. The hydraulic braking system as recited in claim 1, wherein the second brake pressure generator includes at least a second interruption arrangement, via which the master brake cylinder is hydraulically connectable to the wheel brake cylinder.

3. The hydraulic braking system as recited in claim 2, wherein:
    the second brake pressure generator includes at least a pump and a check valve, the pump and the check valve are connected in parallel to the second interruption arrangement, and
    the wheel brake cylinder is able to be applied with pressure with the aid of the pump.

4. The hydraulic braking system as recited in claim 1, wherein:
    the second brake pressure generator is one of:
    attachable as a separate component to the first brake pressure generator, and
    integrated into a shared component with the first brake pressure generator.

5. The hydraulic braking system as recited in claim 4, wherein the second brake pressure generator is attachable by being one of flange-mountable and screwable.

6. The hydraulic braking system as recited in claim 1, wherein:
    the second brake pressure generator includes a motor assigned to the second brake pressure generator and a control unit assigned to the second brake pressure generator, and
    at least one of the control unit and the motor of the second brake pressure generator includes a power supply.

7. The hydraulic braking system as recited in claim 1, wherein the second brake pressure generator is provided as a separate component.

8. The hydraulic braking system as recited in claim 1, wherein a value of the brake pressure at the at least one wheel brake cylinder is:
    settable in case of a failure of the first brake pressure generator with the aid of the second brake pressure generator, and
    settable in case of a failure of the first brake pressure generator and the second brake pressure generator with the aid of the master brake cylinder.

9. A hydraulic braking system, comprising:
    a master brake cylinder;
    a first brake pressure generator;
    at least one wheel brake cylinder;
    a second brake pressure generator connected to the wheel brake cylinder, wherein the master brake cylinder is hydraulically connectable to the wheel brake cylinder via the second brake pressure generator;
    a first interruption arrangement via which the first and the second brake pressure generators and the master brake cylinder are connectable to the at least one wheel brake cylinder;
    a second interruption arrangement, via which the master brake cylinder is hydraulically connectable to the wheel brake cylinder;
    a hydraulic line that connects the first and the second interruption arrangements; and
    a third interruption arrangement between the first and the second interruption arrangements in the hydraulic line.

10. The hydraulic braking system as recited in claim 9, wherein the first brake pressure generator is hydraulically connected between the first and the third interruption arrangements.

11. The hydraulic braking system as recited in claim 9, wherein the first brake pressure generator is hydraulically connected between the first and the third interruption arrangements via a fourth interruption arrangement.

12. The hydraulic braking system as recited in claim 9, wherein the first brake pressure generator is hydraulically connected between the first and the third interruption arrangements, a hydraulic flow-through occurring through chambers of the first brake pressure generator.

13. A method for operating a braking system, comprising:
    receiving a signal by a second brake pressure generator from a first brake pressure generator regarding a malfunction of the first brake pressure generator;
    hydraulically decoupling the first brake pressure generator from at least one wheel brake cylinder;
    hydraulically connecting the second brake pressure generator to the at least one wheel brake cylinder via a first interruption arrangement, via which the first and the second brake pressure generators and the master brake cylinder are connectable to the at least one wheel brake cylinder, and another interruption arrangement, in a hydraulic line connecting the second brake pressure generator to the first interruption arrangement; and
    setting a brake pressure in the at least one wheel brake cylinder with the aid of the second brake pressure generator.

14. The method as recited in claim 13, wherein the brake pressure is set in the at least one wheel brake cylinder with the aid of a pump of the second brake pressure generator.

15. The method as recited in claim 13, wherein the first brake pressure generator is hydraulically connected between the first and the third interruption arrangements.

16. A method for operating a braking system, comprising:
    hydraulically decoupling a first brake pressure generator from at least one wheel brake cylinder and hydraulically connecting a second brake pressure generator to the at least one wheel brake cylinder in response to receiving by the second brake pressure generator a signal over a communication line between the first brake pressure generator and the second brake pressure generator regarding a malfunction of the first brake pressure generator; and upon establishing a defective communication between the first and the second brake pressure generators, switching the first and the second brake pressure generators into an operating mode with reduced hydraulic pressure output.

17. The method as recited in claim 16, wherein the reduced hydraulic pressure output is within a predefined output interval.

18. The method as recited in claim 16, wherein the reduced hydraulic pressure output is within a predefined output interval between 50% and 67% of a maximum output.

19. A hydraulic braking system, comprising:
a master brake cylinder;
a first brake pressure generator;
at least one wheel brake cylinder; and
a second brake pressure generator connected to the wheel brake cylinder, wherein the master brake cylinder is hydraulically connectable to the wheel brake cylinder via the second brake pressure generator,
wherein the first and the second brake pressure generators switch into an operating mode providing reduced hydraulic pressure output in case of failure of a communication between the first and the second brake pressure generators.

* * * * *